Patented July 4, 1939

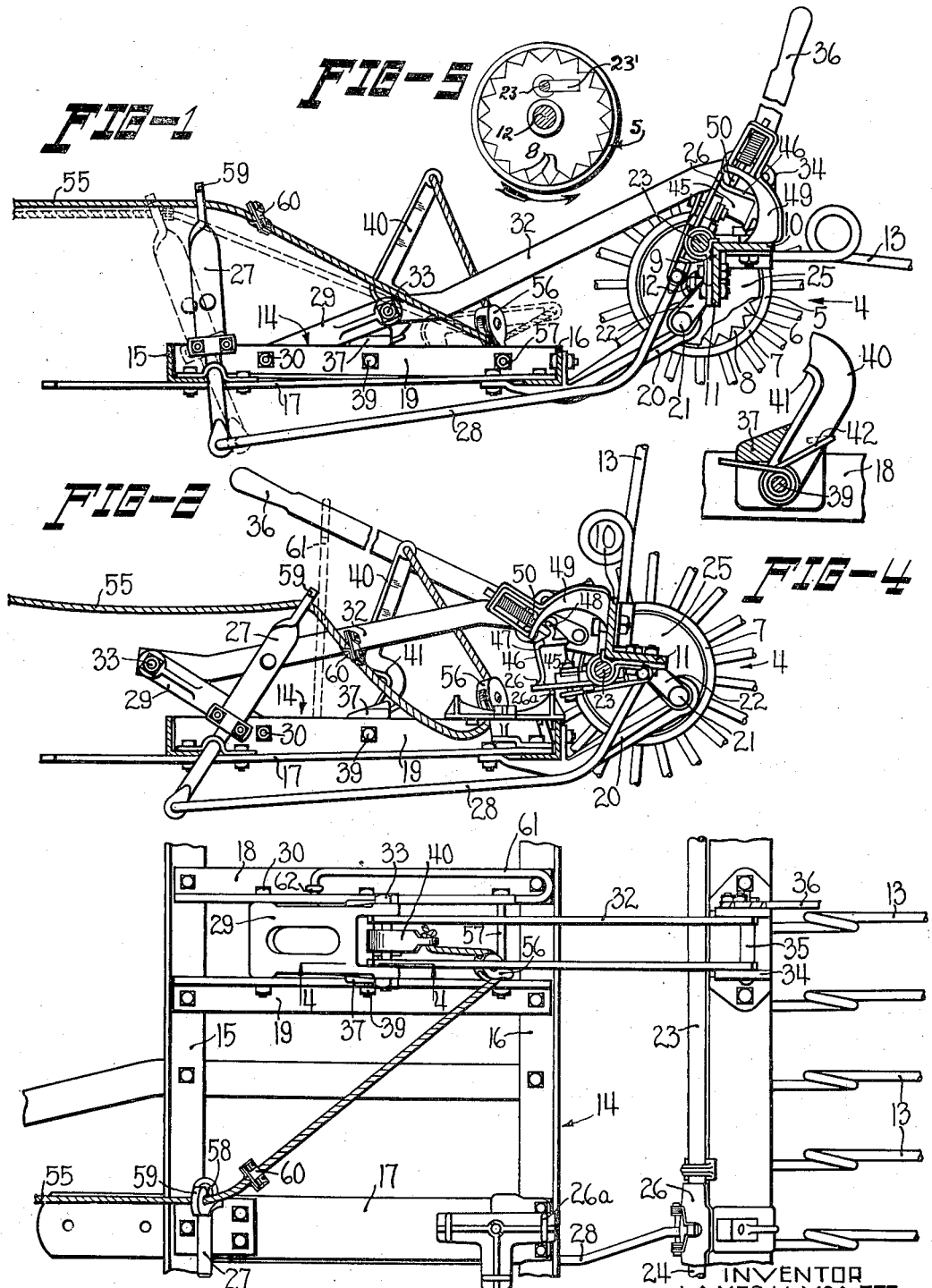

2,165,110

UNITED STATES PATENT OFFICE 2,165,110

CONTROL DEVICE FOR DUMP RAKES

James H. McAfee, Falmouth, Maine, assignor to Deere & Company, Moline, Ill., a corporation of Illinois Application September 30, 1936, Serial No. 103,272

9 Claims. (Cl. 56—391)

This invention relates to what are generally known as self dumping hay rakes, or rakes in which the rake head is swung upward to dump its load of gathered hay by forward rotation of one or both of its supporting wheels. The dumping mechanism, which comprises dogs connected with the rake head and movable into engagement with the teeth of ratchet wheels carried by and rotating with the carrying wheels, is normally inoperative and is thrown into operation at the option of the operator. When the rake head has been swung upward to the limit of its dumping movement the dumping mechanism is automatically disconnected and the rake head thereupon returns by gravity to its operative position.

Heretofore, rakes of this type have required an operator on the rake to hold the rake teeth against the ground by a foot lever operating through a toggle link connection, and, at the proper time, to release the foot lever and operate a tripping lever to actuate the dumping mechanism. Although in the case of horse-drawn rakes, the operator's seat is conveniently located on the rake itself, when such a rake is drawn by a tractor, it is more convenient for the operator to sit on the tractor seat. It is the object of this invention to provide means which can be applied to such a rake to permit the dumping of the rake to be controlled from the operator's seat on the tractor.

In accomplishing this object, I employ a locking lever for engaging the toggle mechanism to hold the teeth in ground-engaging position and a rope connected to the locking lever by means of which the operator can release the lever, and by a further pull on the rope the tripping lever is actuated to operate the dumping mechanism. In this manner the proper sequence of operations is at all times insured.

I will now describe my invention and explain the operation thereof to those skilled in the art, reference being had to the accompanying drawing in which:

Figure 1 is a fragmentary view, being a partial longitudinal vertical section taken through the rake head and draft frame parallel to the line of advance of the implement, showing the rake head in its normal operating position;

Figure 2 is a similar view showing the rake head in its dumping position, just before it has reached the position in which it is automatically released to return to operating position;

Figure 3 is a plan view of the parts in the position shown in Figure 1; and,

Figure 4 is a fragmentary elevation of the holding lever, as viewed along a line 4—4 in Figure 3.

Figure 5 is a view showing the ratchet wheel and dog by which the rake head is connected with the carrying wheels to accomplish the dumping of the load.

The embodiment shown and described herein is based on a design of rake disclosed by Wilbur J. Coultas in Patents, No. 1,850,384 and No. 1,850,385, both dated March 22, 1932, but it is understood that my invention is not limited to this particular design.

Referring to the drawing, 4 indicates one of the carrying wheels and 5 a ratchet wheel that may be secured to or be formed integral with the hub thereof. As usual, the ratchet wheel 5, one of which is carried by each carrying wheel, preferably comprises a radial portion 6 having an inwardly projecting marginal flange 7 provided with internal ratchet teeth 8. It will be understood that these ratchet wheels turn with the carrying wheels to which they are affixed.

The rake head is of conventional design, and preferably comprises a beam 9 that extends from one of the carrying wheels to the other, this beam being in the form of an angle iron having a horizontal flange 10 and a vertical flange 11. Secured to each end portion of the vertical flange 11 is a stub axle 12 upon which stub axles the carrying wheels 4 are journaled in the usual way. These stub axles are offset a short distance beyond the front face of the vertical flange 11 so that when the rake head is in its operating position said flange lies somewhat back of the axial line of the axles 12, and consequently the rake head may be swung upward and forward from its operating position about the axles 12 as pivotal supports. The rake head carries the usual rake teeth 13 which are secured to its horizontal flange 10 and extend rearwardly therefrom. A draft frame 14, preferably comprises front and rear transverse bars 15, 16, and a central intermediate bar 17. Preferably the end portions of the front bar 15 are bent back so that they diverge rearwardly and are connected with the rear bar 16. Also connecting the front and rear bars at a point somewhat to one side of the bar 17 are two oppositely arranged angle bars 18, 19 set with their vertical flanges spaced apart sufficiently to receive between them certain parts that will be hereinafter described. The draft frame extends forward from the rake head 9 in a horizontal plane somewhat below the axis of the carrying wheels, as shown in Fig. 1, and is pivotally connected with the rake head by rearwardly projecting brackets 20 that are secured to the rear portion of the draft frame at convenient intervals, preferably four of such brackets being provided.

The rear ends of these brackets are connected by pivots 21 with lugs 22 that project downward and forward from the vertical flange 11 of the rake head, as best shown in Fig. 1. When the rake head is actuated, either to dump it, or to return it to its operative position, it swings about the axial line of the stub axles 12, which turn in the carrying wheel bearings, the wheels, of course, rotating on such stub axles. The rake head may, therefore, be swung from the position shown in Fig. 1, where its horizontal flange 10 is in its normal position, to the position shown in Fig. 2, where its horizontal flange 10 assumes an approximately vertical position. In this operation the lugs 22 are swung backward and upward, lifting the rear portion of the draft frame, so that its weight tends not only to check the upward movement of the rake head as it is released from the load and so becomes lighter, but also to move the rake teeth back to their operating position after dumping has been accomplished.

Pivotally mounted on the rake head eccentrically with reference to the stub axles 12 are two rock shafts 23, 24, each of which is approximately half as long as the rake head. These rock shafts are alined with each other and extend in opposite directions from about the center of the rake head to the ratchet wheels 5, their outer ends being journaled in plates or discs 25 on the end portions of the stub axles 12 in position to extend over the inner faces of said ratchet wheels. These plates, which are secured on the stub axles 12 and normally do not turn with the ratchet wheels with which they are associated, are provided with bearings that receive and pivotally support the outer end portions of the rock shafts 23, 24, respectively.

At their outer ends said rock shafts are bent at right angles to form, or are otherwise provided with dogs 23′ that underlie the ratchet teeth 8 as shown in Figure 5, and are adapted to be moved into engagement with said teeth by the rocking of said rock shafts, so that when such engagement has been effected the rock shafts, and with them the rake head, may be caused to turn with the ratchet wheels 5 about the axis of the carrying wheels.

In the arrangement shown, rocking the rock shafts 23, 24 in a counterclockwise direction moves their respective dogs into engagement with the ratchet teeth 8, and causes the rake head to swing in the same direction to dump it.

The inner ends of the rock shafts 23, 24 are also bent at right angles to form crank arms that are parallel with each other and lie at opposite sides of and adjacent to the center of the rake head, and extend over the rear face of a trip plate 26, which pivotally carries the inner ends of said rock shafts. The connections between the trip plate and the rock shafts 23, 24 have not been illustrated as my present invention is not dependent upon the specific construction of the tripping devices or the operating connections thereof. The construction that I prefer to employ is fully shown and described in the above-mentioned Patent No. 1,850,384, but so far as my present invention is concerned any suitable means for the purpose may be employed. It will be sufficient to say that the rock shafts 23, 24 are rocked to move their dogs into operative engagement with the ratchet teeth 8 by rocking the trip plate 26 in one direction by the actuation of a foot lever 27 mounted on the forward portion of the draft frame 14, preferably on the bar 17 as shown in Fig. 3. The plate 26 is provided at its upper portion with a rearwardly projecting arm 45, preferably cast integral therewith, the upper surface of which arm is made angular in contour to provide two surfaces 46, 47 at a pronounced angle to each other, the surface 47 being provided at its end with a curved lip 48. A bracket 49 is secured to the horizontal flange 10 of the rake head and rises therefrom opposite the arm 45. The bracket 49 carries a spring-backed plunger 50 which bears on one or the other of the surfaces 46, 47 of the arm 45. The plunger 50 serves as a detent to normally hold the plate 26 against movement relative to the bracket 49. In the normal position of the rake the plunger bears on the surface 46, as shown in Fig. 1, while with the trip plate 26 rocked into position for engaging the dogs with the ratchet teeth 8, the plate is held in this position by the plunger engaging the recess defined by the surface 47 and the lip 48.

The lever 27 is connected by a connecting rod 28 with said trip plate in such manner that by pressing down on said foot lever the connecting rod 28 will be moved rearwardly to rock the trip plate 26 and the rock shaft 23, 24 in a counterclockwise direction. When the rake head nears the limit of its upward movement the trip plate 26 engages the draft frame, or a suitable stop 26a carried by it, so that further movement of the rake head in the same direction moves the trip plate 26 relatively in the opposite direction and thereby rocks the rock shafts 23, 24 in a clockwise direction to move the dogs out of engagement with the ratchet teeth 8, thereby releasing the rake head so that it may return to its operating position.

29 indicates a link, the forward end of which extends between the vertical flanges of the bars 18, 19 near their forward ends, and is pivotally connected therewith by a pivot 30. A link 32 is pivotally connected with the free end portion of the link 29 by a pivot 33 and extends rearwardly to a standard 34 secured to and rising from the horizontal flange 10 of the rake head. A pivot 35 connects the rearward end of the link 32 with said standard. Said links thus form a toggle, the members of which are approximately alined when the rake head is in its operating position shown in Fig. 1, but when the rake head is swung to dump, the toggle breaks upwardly and the link 29 therefore swings forwardly so that the toggle members them assume a position of acute angularity with respect to each other, as shown in Fig. 2. The link 32 is best made of two parallel bars spaced apart, but this is not essential.

Preferably a hand lever 36 is connected with the standard 34 so that the rake head may be swung by hand when necessary. To prevent the toggle members from coming to a fully alined position, or forming a past center lock, a stop 37 is provided on the draft frame in position to intercept the free end portion of the link 29 and prevent it from swinging backward and downward far enough to fully aline with the link 32. This stop is secured to the vertical flanges of the bars 18, 19 by a bolt 39 as evident in Fig. 4.

Pivoted on this bolt 39 is a locking lever 40 which is shaped to provide a hook portion 41, adapted to hook over the pivot bolt 33 between the links 29, 32, when the latter are straightened to their normal operating position as shown in Fig. 1. Thus the locking lever 40 effectively holds the toggle links in a nearly dead center position, thereby maintaining the rake in a ground-engaging position. Since the links are nearly aligned, very little force is exerted against the locking hook 41, therefore only a slight pull against the lever 40 will release the hook portion 41 from the bolt 33, allowing the rake to be dumped by the dumping mechanism.

The lever 40 is held in locking position by a spring 42 coiled around the pivot bolt 39 and adapted to force the lever 40 up against the back of the stop 37, as shown in Fig. 4.

The lever 40 is operated from the operator's position (not shown) forward of the rake by means of an operating rope 55 fastened to the end of the lever 40 and trained through a pulley block 56 which is secured by a bolt 57 passing through the vertical flanges of the angle members 18, 19. From the block, the rope passes through a hole 58 in an upwardly extending ear 59 on the foot lever 27. The hole is larger than the rope to allow the rope to slide freely therethrough.

A clip 60, fixed tightly on the rope, acts as a stop to engage the ear 59 of the lever 27, the clip being too large to pass through the hole 58. A knot in the rope could be substituted for the clip 60 if desired. The stop 60 is so located that it does not engage the lever 27 until the lever 40 has been pulled clear of the bolt 33.

The operation of the device is as follows:

With the rake operating in its normal ground-engaging position as shown in Fig. 1 in solid lines, when it is desired to dump the rake, the rope 55 is pulled by the operator. During the first part of the movement of the rope, the lever 40 is swung backwardly, the rope passing around the pulley 56 and sliding through the hole 58 in the foot lever 27. After the lever 40 has released the toggle bolt 33, the stop 60 engages the ear 59, whereby the last part of the movement of the rope swings the trip lever 27 around its pivot into the position shown in dotted lines, the locking lever 40 assuming the position also shown in dotted lines. In this position the shafts 23, 24 have been rotated to engage the lifting mechanism as described.

Since the tripping plate 26 is held in this position by the detent 50 on the surface 47 of the arm 45, the rope may be immediately released, the spring 42 acting to return the locking lever 40 to normal position, while the rake head continues through its dumping cycle as previously described, without further attention from the operator.

The rake can be secured in its transport position with the fingers raised from the ground by means of a hook 61 adapted to engage the handle 36 when the rake is in maximum raised position, as shown in dotted lines in Fig. 2. The hook 61 is pivoted to the frame member 18 at 62 as shown in Fig. 3.

What I desire to protect by Letters Patent of the United States is set forth in the following claims.

I claim:

1. For use with a tractor-drawn dump rake comprising a rake head provided with rake teeth and carrying wheels, mechanism for dumping the rake, actuating means for said mechanism, means for holding said teeth in ground-engaging position, and dumping control means comprising a single operating member controlled from a position on the tractor, said member being connected to said holding means for optionally releasing the latter, and having means for engaging said dumping mechanism actuating means after the holding means has been released.

2. For use with a tractor-drawn dump rake comprising a rake head provided with rake teeth and carrying wheels, means operable to dump the rake by rotation of said wheels, tripping mechanism for said dumping means, a draft frame, toggle mechanism connected between said rake head and said frame and operable to hold said teeth in engagement with the ground, and dumping control means including means for unlocking said toggle mechanism, and means for engaging said unlocking means with said tripping mechanism independent of said toggle mechanism, to actuate said tripping mechanism after said toggle mechanism has been unlocked.

3. In a tractor-drawn dump rake comprising a rake head provided with rake teeth and carrying wheels, means operable to dump the rake by rotation of said wheels, tripping mechanism for said dumping means including a tripping lever, mechanism for holding said teeth in ground-engaging position including a locking member, an actuating rope fastened to said locking member, and a stop on said rope adapted to engage said tripping lever after the rope has been pulled to unlock said locking member, whereby further pulling on said rope actuates said tripping lever.

4. For use with a tractor-drawn dump rake comprising a rake head provided with rake teeth and carrying wheels, means operable to dump the rake by rotation of said wheels, tripping mechanism for said dumping means including a tripping lever, a draft frame, toggle mechanism connected between said rake head and said frame and operable to hold said teeth in engagement with the ground, a locking lever for said toggle mechanism, and an actuating rope fastened to said locking lever and disposed slidably relative to said tripping lever, said rope having means for engaging said tripping lever for actuating the same after the rope has been pulled to actuate said locking lever.

5. In a dump rake comprising a wheel supported frame and a rake head pivoted thereto and provided with rake teeth, holding means for locking said head relative to said frame in raking position, a disengageable dog for locking said head to said wheels to rotate therewith, and a common control member connected to said holding means and to said dog for unlocking said holding means and for moving said dog into locked position by a single actuation of said control member.

6. In a dump rake comprising a wheel supported frame and a rake head pivoted thereto and provided with rake teeth, holding means for locking said head relative to said frame in raking position, a source of power including a normally rotating member, a disengageable dog for locking said head to said member to rotate therewith, and a common control member connected to said holding means and to said dog for unlocking said holding means and for moving said dog into locked position by a single actuation of said control member.

7. In a dump rake comprising a wheel supported frame and a rake head pivoted thereto and provided with rake teeth, holding means for locking said head relative to said frame in raking position, a source of power including a normally rotating member, means for connecting said head to said rotating member to dump the rake, and control means connected to said holding means and to said connecting means, and adapted to unlock said holding means and to actuate said connecting means progressively in a predetermined sequence upon an actuation of said control means.

8. In a dump rake comprising a wheel supported frame and a rake head pivoted thereto and provided with rake teeth, holding means for locking said head relative to said frame in raking position, a source of power including a normally rotating member, mechanism for connecting said head to said member to be rotated thereby, and dumping control means including a common control member, means connected to said control member for unlocking said holding means and means adapted to engage said unlocking means with said connecting mechanism, to actuate said mechanism after said holding means has been unlocked.

9. In a tractor drawn dump rake comprising a rake head provided with rake teeth, a source of power including a normally rotating member, means operable to dump the rake by rotation of said member, tripping mechanism for said dumping means including a tripping lever, mechanism for holding said teeth in ground-engaging position including a locking member, an actuating rope fastened to said locking member, and a stop on said rope adapted to engage said tripping lever after the rope has been pulled to unlock said locking member, whereby further pulling on said rope actuates said tripping lever.

JAMES H. McAFEE.